United States Patent [19]

Alieri

[11] Patent Number: 5,807,592
[45] Date of Patent: Sep. 15, 1998

[54] APPARATUS FOR PRESSURE-MOLDING ITEMS MADE OF PLASTICS, SUCH AS CAPS FOR CLOSING CONTAINERS

[75] Inventor: Rodiero Alieri, Imola, Italy

[73] Assignee: SACMI Cooperative Meccanici Imola S.c.r.l., Imola, Italy

[21] Appl. No.: 737,586

[22] PCT Filed: May 17, 1995

[86] PCT No.: PCT/EP95/01869

§ 371 Date: Nov. 20, 1996

§ 102(e) Date: Nov. 20, 1996

[87] PCT Pub. No.: WO95/32086

PCT Pub. Date: Nov. 30, 1995

[30] Foreign Application Priority Data

May 23, 1994 [IT] Italy ............................... BO94A0242

[51] Int. Cl.⁶ .................................................. B29C 43/58
[52] U.S. Cl. ...................... 425/347; 425/348 R; 425/411; 425/415
[58] Field of Search .................................. 425/346, 247, 425/348 R, 411, 415

[56] References Cited

U.S. PATENT DOCUMENTS 3,775,032 11/1973 Smith et al. .............................. 425/415
5,071,339 12/1991 Murayama et al. .
5,580,586 12/1996 Yokoyama ............................... 425/415

FOREIGN PATENT DOCUMENTS

A0474128 3/1992 European Pat. Off. .

OTHER PUBLICATIONS

Soviet Engineering Design, vol. 6, No. 7, Jul. 1985 Melton Mowbray, Leicestershire, Gr. Britain, pp. 37–39, Sokolov et al. "Strucural Analysis of Rotary Mechanics for Pressing of Plastic Materials"—see figure 2. see figure 2.

*Primary Examiner*—Tim Heitbrink
*Attorney, Agent, or Firm*—Guido Modiano; Albert Josif

[57] ABSTRACT

The apparatus comprises a rotating carousel provided with pressure-molding units for items made of plastics. Each unit comprises a mold having a molding cavity into which a dose of plastics is brought by means of a feeding head which is rotatable outside of the carousel, said dose being removed from an extrusion device by means of removal elements which are rigidly coupled to the head.

12 Claims, 5 Drawing Sheets

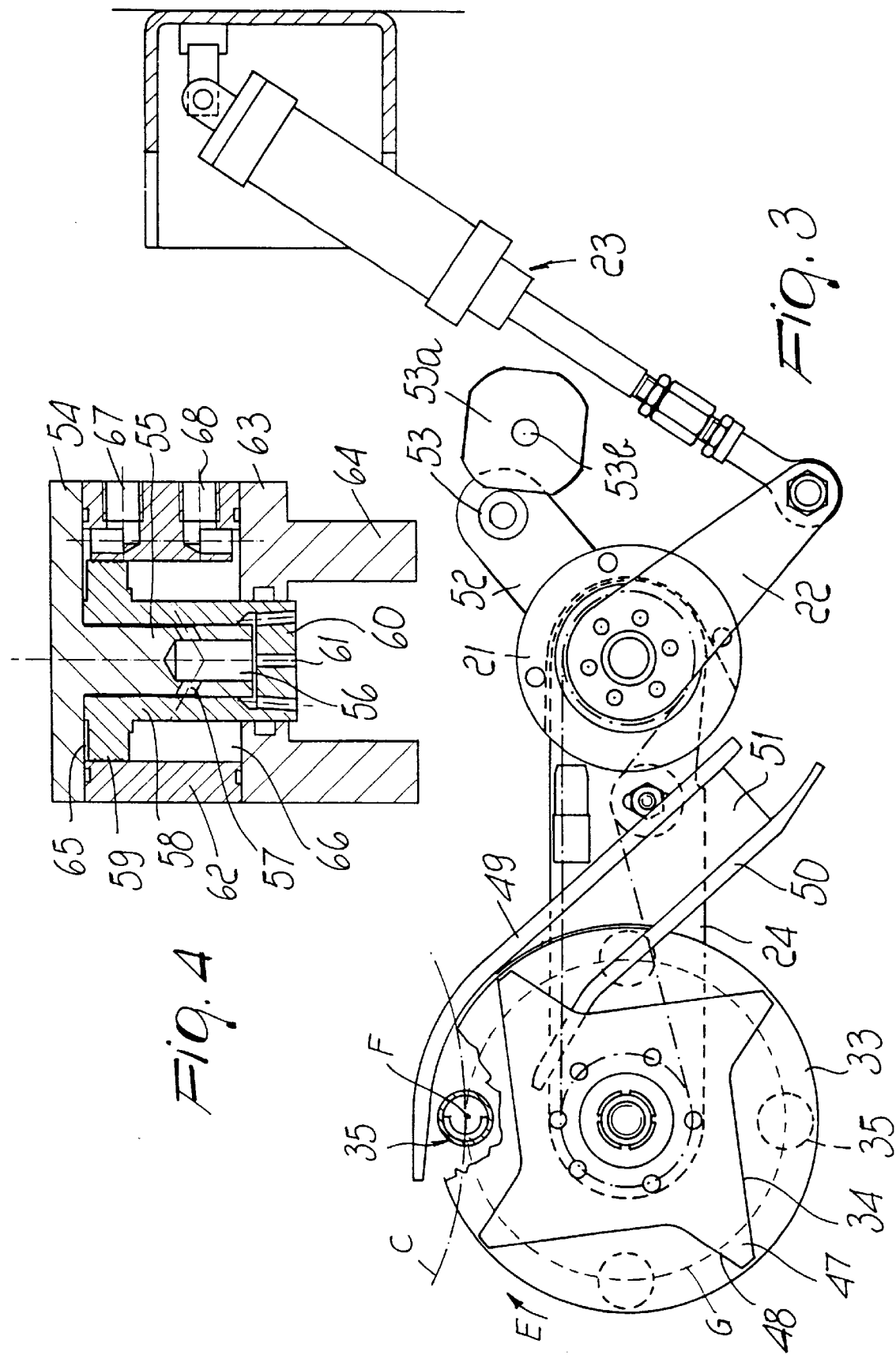

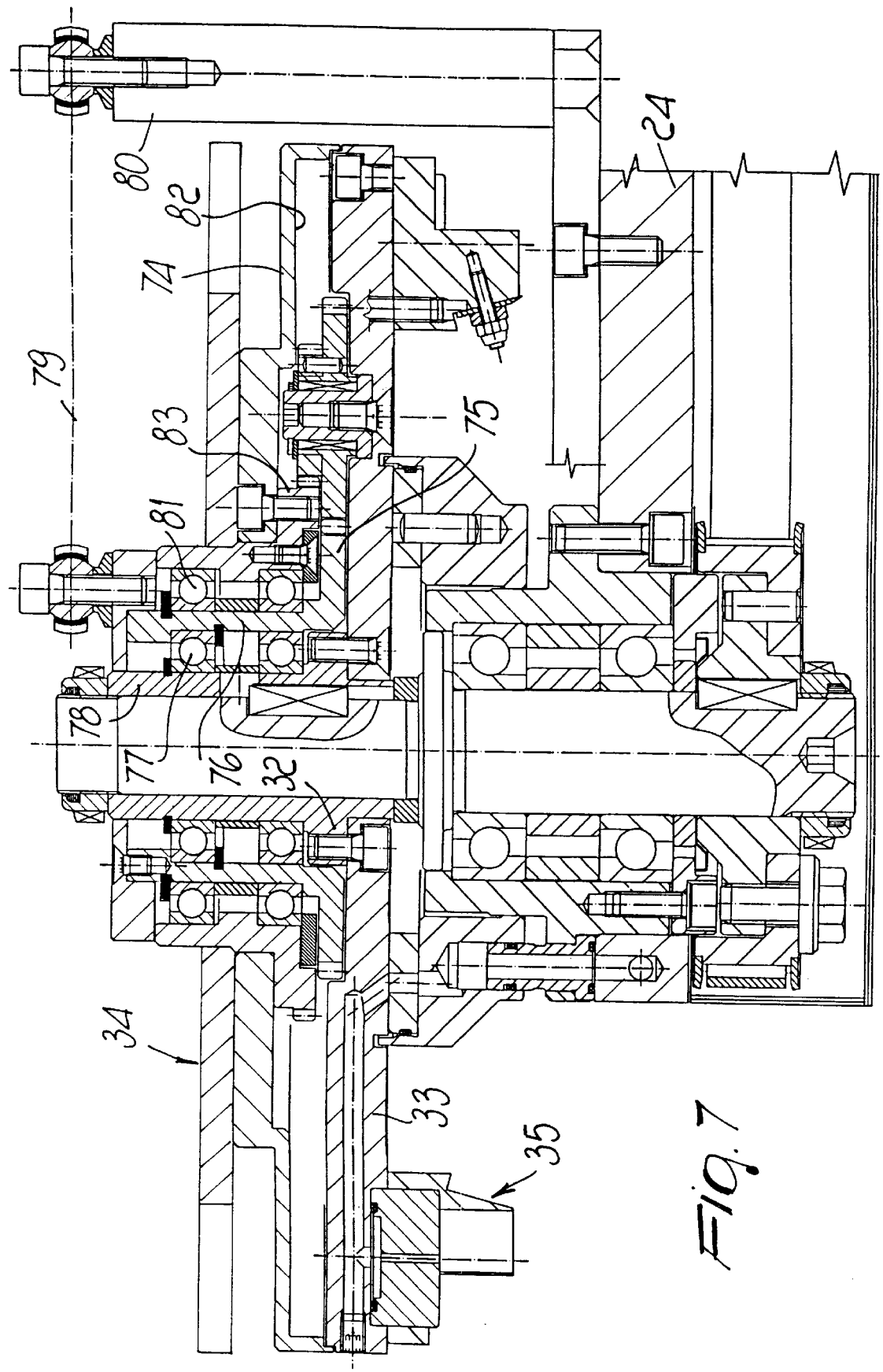

APPARATUS FOR PRESSURE-MOLDING ITEMS MADE OF PLASTICS, SUCH AS CAPS FOR CLOSING CONTAINERS

TECHNICAL FIELD

The present invention relates to an apparatus for pressure-molding items made of plastics, such as caps for closing containers, glasses, and the like.

BACKGROUND ART

Conventional devices for pressure-molding caps for closing containers, such as screw caps, comprise: a rotating pressure-molding carousel composed of a supporting element that rotates about a vertical central axis; a plurality of pressure-molding units that are mounted on said rotating supporting element concentrically to said central axis and at the same angular distance from each other, each one of said units comprising an upper punch and a lower mold that has a molding cavity, said punches and molds cooperating with each other and being movable with respect to each other along vertical axes; means for actuating said supporting element so that said molding units advance along a circular path that includes a region for loading the plastics to be molded, a molding region, a cooling region, and a region for unloading the molded item; and means for moving the punches with respect to the molds along the corresponding axes according to a preset criterion during the rotation of said supporting element. Such a conventional device is known from the prior document EP-A-474 125.

Drawbacks during the loading of the plastics in the molding units are observed in these known devices, since it is necessary to strike a compromise between the quick removal of the doses and the deposition of the doses in the molding cavities.

SUMMARY OF THE INVENTION

The technical aim of the present invention is to provide an apparatus for obviating these drawbacks.

Within the scope of this aim, an object of the present invention is to provide an apparatus in which the loading means are structured so that they can be moved away from the molding units so as not to interfere with them in case of jammings in said units.

Another object is to provide an apparatus that allows to remove the items that arrive from the molding carousel after cooling.

This aim and these objects are achieved with an apparatus whose characteristics are defined in the claims.

BRIEF DESCRIPTION OF THE DRAWINGS

Further characteristics of the present invention will become apparent from the following description on the basis of the accompanying drawings, wherein:

FIG. 3 is a plan view of the portion shown in FIG. 2;

FIG. 4 is a vertical sectional view of a variation of the removal elements;

FIG. 7 is a sectional view of a third embodiment.

DESCRIPTION OF THE PREFERRED EMBODIMENTS

Figure 1:
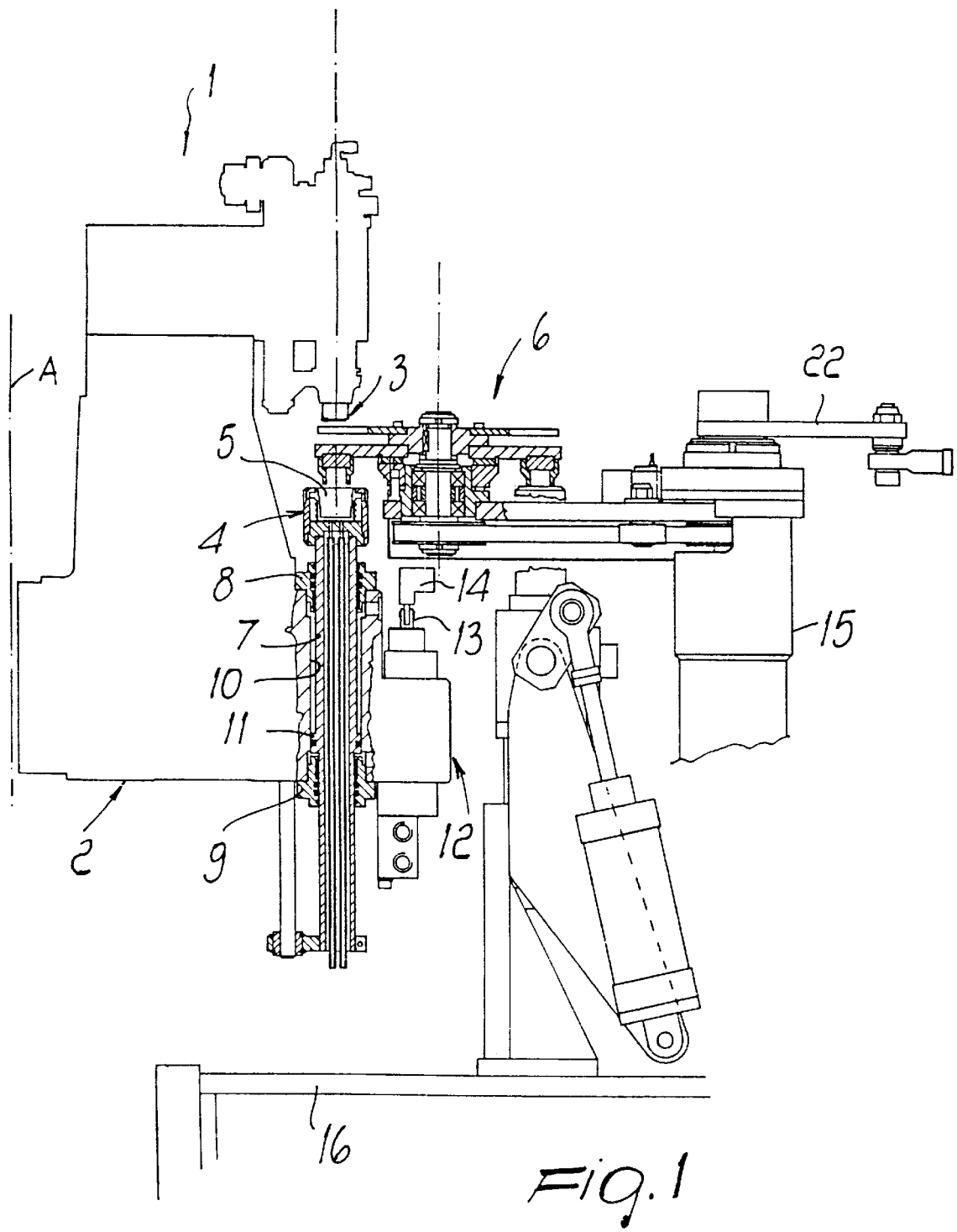
FIG. 1 is a vertical sectional view of a part of an apparatus for pressure-molding caps for closing containers.
Figure 2:
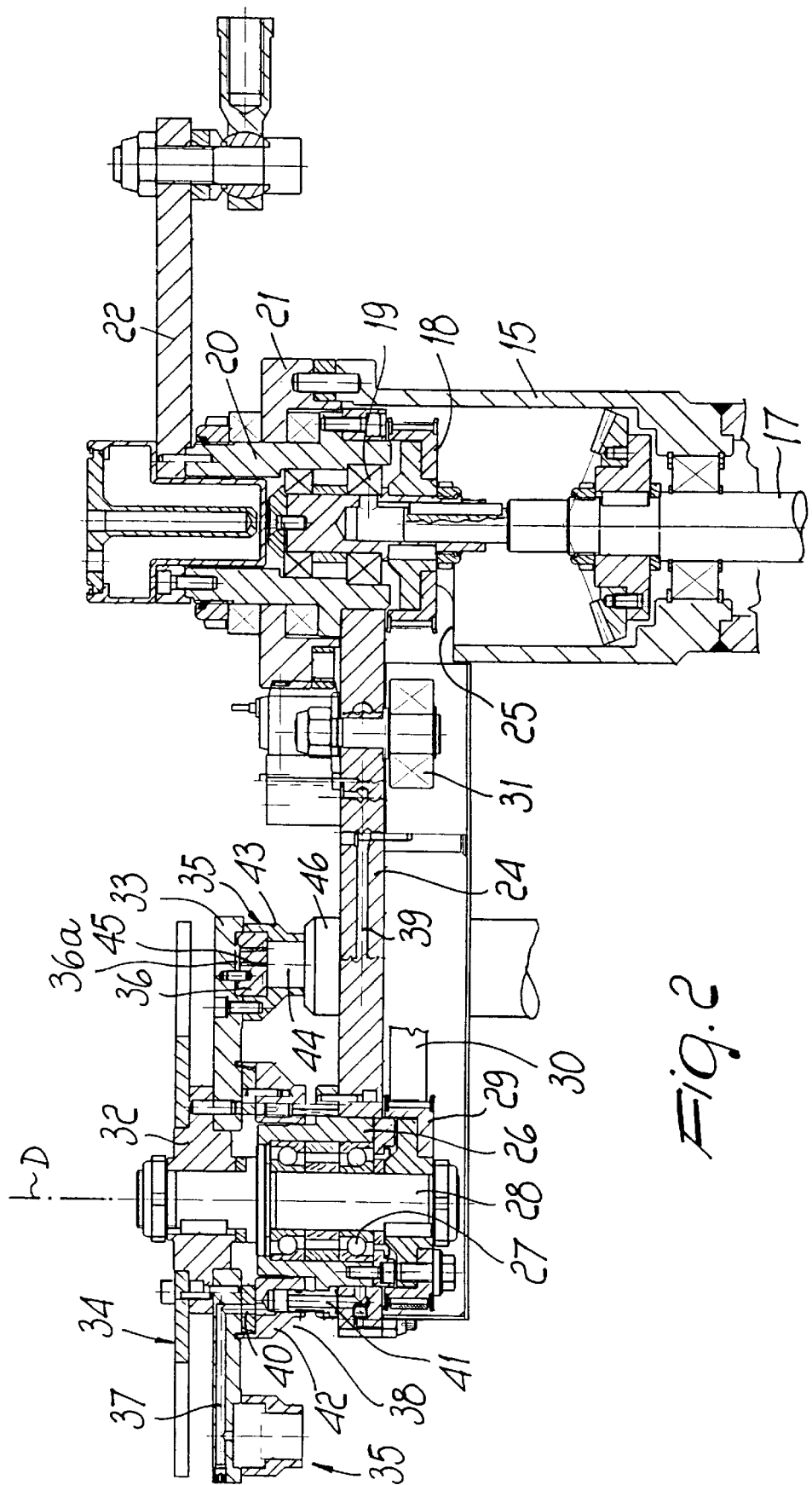
FIG. 2 is a vertical sectional view of a portion of FIG. 1.

With reference to FIGS. 1 to 3, the apparatus comprises a carousel that is generally designated by the reference numeral 1 and rotates about a vertical axis A. The carousel comprises a supporting element 2 on which a plurality of molding units are mounted; each molding unit comprises an upper punch 3, which is fixed with respect to the element 2, and a lower mold 4, which is movable along an axis B for alignment with the punch 3.

The molding units are distributed at an equal angular distance with respect to the axis A, so that their axes B move along a circular path C (see FIG. 3) that is concentric with respect to the axis A.

Each mold 4 has a cavity 5 for molding a dose of material fed by a head 6 that rotates about an axis D that lies outside the path C and is parallel to the axis B.

The mold 4 is mounted at the upper end of a vertical stem 7 that is hermetically guided in two bushes 8 and 9 arranged in a cylindrical seat 10 of the supporting element 2.

The stem 7 is externally provided with a piston 11 that is slideable hermetically within the seat 10 and divides said seat into two superimposed chambers that can be connected to the delivery and to the discharge of a pressurized fluid by means of a valve 12 that is controlled by a slide-valve distributor 13 actuated by a stationary cam 14 that is concentric with respect to the axis A. When the pressurized fluid is fed into the lower chamber by means of the valve 12, the piston 11 is pushed upward and the mold 4, in an appropriate region of the path C, compresses the dose of material, deposited in the cavity 5 by means of the head 6, against the punch 3, molding the item, constituted by a cap in the case being described, along a subsequent arc of the path C. The item is then stabilized in a subsequent cooling region and then expelled.

In an appropriate angular position of the carousel 1, the valve 12 is actuated so that the pressurized fluid is sent into the upper chamber of the seat 10, so as to cause the descent of the mold 4 into the position for receiving a new dose.

The dose feeding head 6 is constituted by a tubular post 15 that rises vertically from the footing 16 of the apparatus.

A shaft 17 is rotatably supported in the post 15 and is connected to motorization means located in the footing; a toothed driving pulley 18 is keyed on said shaft (FIG. 2). The shaft 17 has an end portion that supports, by means of bearings 19, a sleeve 20 that protrudes from the lid 21 that closes the post 15 at the top. An arm 22 is radially rigidly coupled to the sleeve 20, which is supported externally in the lid 21 as well; said arm is connected to the stem of a fluid-actuated jack 23 the cylinder of which is articulated to fixed parts of the footing.

The end of the sleeve 20 that lies inside the post 15 is inserted and connected to a flat linkage or lever 24 that protrudes from the post 15 through an opening 25 that has a given angular extension, so as to allow the linkage 24 to perform given angular strokes.

An additional sleeve 26 is centered and retained in the linkage 24 in the end portion that cantilevers out of the sleeve 20, and a shaft 28 can rotate in said sleeve 26 about the axis D by means of bearings 27; the opposite ends of said shaft 28 protrude upward and downward from the sleeve 26.

A driven toothed pulley 29 is keyed on the lower end, and a toothed belt 30 is wound in a loop around said pulley and closed around the driving pulley 18. A roller 31 is mounted on the linkage 24 in an adjustable position and allows to adjust the correct tension of the belt 30.

A flange 32 is keyed on the upper end of the shaft 28 and is provided with a rigidly coupled pan 33 in a downward region and with a star 34 in an upward region.

The elements 35 for removing the doses of plastics to be molded are rigidly coupled to the face of the pan 33 that is directed downward; said elements are distributed concentrically so as to form equal mutual angles around the axis D.

Each element 35 is composed of a pad 36 that is hermetically recessed in a respective recess of the pan 33, so as to form a compartment 36a which, by means of a respective channel 37 formed radially in the thickness of the pan 33 and of a distributor 38, can be connected to a channel 39 that runs inside the linkage 24. The channel 39 is connected to a source of compressed air by means of a connector that is fixed to the linkage 24. The rotating distributor 38 comprises, for each element 35, a slot 40 that is capable of maintaining the connection between the compartment 36a of the removal element 35 from which the dose of removed plastics is to be expelled, as will become apparent hereinafter, and the channel 39 and therefore the compressed air.

In order to convey the air from the channel 39 towards the distributor there is a tube 41 that connects the linkage 24 and the ring 42 of the distributor and is fixed outside the sleeve 26.

The pad 36 is retained in its recess of the pan 33 by a sort of cup 43 provided with a semicylindrical concave portion 44 that is open in the advancement direction E (FIG. 3).

Various through holes 45 lead into the concave portions 44 and originate from the compartment 36.

The lower edge of the cups 43 is co-planar with respect to the outlet of an extrusion nozzle 46 (FIGS. 1 and 2) that is directed upward so that during the rotation of the head 6 each cup 43 can remove from the nozzle 46 a dose of material that corresponds to the dose that exits from said nozzle during the time between the passage of one cup 43 and the passage of the next cup in front of the nozzle 46.

The star 34 is more clearly shown in FIG. 3. It comprises a number of radial arms 47 that is equal to the number of removal elements 35, and its outside diameter is equal to the outside diameter of the pan 33; said arms are shaped so as to have a substantially radial leading edge 48 on the side that is orientated in the advancement direction E.

The star 34 is meant to convey the caps (which leave the carousel 1 after passing through the cooling region) between two mutually parallel guides 49 and 50 that comprise two portions that are concentric to the axis D, that is to say, to the shaft 28, and two portions that protrude tangentially from the pan 33.

In practice, the guides 49 and 50 are constituted by two strips, which are located at a level that lies between the pan 33 and the star 34 and are mutually connected, in the tangent portion that lies outside the pan 33, by a plane 51, so as to form a removal channel.

The operation of the apparatus according to the invention is fully evident from the following description.

In particular, by virtue of the rotation of the head 6 produced by the actuation of the shaft 17 by means of the belt 30, the cups 43 remove respective doses of products from the extrusion nozzle 46. The consistency of the plastics at the outlet of the nozzle 46 allows the dose to cling to the wall of the concave portion 44.

When a cup 43 with the removed dose is located at the point of tangency F (FIG. 3) between the path C followed by the molds 4 and the path G followed by the cups 43, compressed air is fed through the distributor 38 and expels the dose, projecting it into the molding cavity 5 of the underlying mold 4. The cap is molded in the above described manner until, at the exit of the carousel 1, the stabilized cap is disengaged from the punch 3 and deposited on the pan 33, where it is pushed by the arm 47 between the guides 49 and 50 and conveyed towards a collection point. The described apparatus is susceptible of numerous modifications and variations, all of which are within the scope of the same inventive concept.

A first embodiment optionally provides, on the shaft 17, a synchronization device of a conventional type to achieve an angular adjustment of the head 6 with respect to the carousel 1. This adjustment allows to move the removal element 35 with respect to the mold 4 in order to optimize the point where the dose passes from the cup 43 into the cavity 5, taking into account the time required to perform this transfer.

Likewise, it is possible to slightly move the head 6 towards the axis A of the carousel 1 when the individual removal elements 35 are about to overlap the respective molds 4. As shown by FIG. 3, this movement can be achieved by providing the linkage 24 with an additional arm 52 provided with a roller 53 that follows a radial actuation cam 53a mounted on a secondary shaft 53b that is driven by the shaft 17 by means of a transmission that has an appropriate ratio.

This movement allows the path G of the removal elements 35 to overlap, over a certain angle, the path C of the molds and thus perform the transfer of the doses in a longer time.

The actuation cam 53a of the head is shaped so that the head 6 returns into the position in which the cups 43 overlap the nozzle of the extruder 46 to remove the doses along the arc of the path G in which the removal elements 35 are not superimposed on the molds.

Another embodiment of the invention, shown in FIG. 4, relates to a particular embodiment of the means for expelling the doses from the cups 43.

In FIG. 4, each removal element 35 is constituted by a small plate 54 that is adapted to be fixed below the pan 33. A tang 55 extends downward from the small plate 54 and is provided with a hole 56 that leads out axially and with holes 57 that are connected to the hole 56 and lead out radially.

A tubular stem 58 is guided on the tang 55 and has a piston 59 at its upper end. The cavity of the stem 58 is closed in a downward region by a disk 60 in which appropriately distributed and orientated through holes 61 are formed.

The piston 59 slides within a bush 62 that is hermetically interposed and arranged concentrically with respect to the tang 55 between the small plate 54 and the base 63, which supports a cup 64 that is similar to the cup 43 of the embodiment of FIGS. 1 to 3.

The piston 59 divides the sliding bush 62 into two chambers 65 and 66 that can be connected to a source of compressed air through ducts 67 and 68 formed in the bush 62, through channels of the pan 33, and through valve means that are not shown but are fully imaginable.

The thickness of the piston 59 is such that when it rests on the base 63 the radial holes 57 connect the axial hole 56 to the chamber 65.

Accordingly, when the cup 64 has removed a dose of product, the activation of the piston 59 (by means of the connection of the chamber 65 to the source of compressed air) causes the mechanical expulsion of the removed dose from the cup 64 and then, when the piston 59 has moved below the holes 57, pneumatic expulsion by means of the compressed air that flows out of the holes 61.

Figure 5:
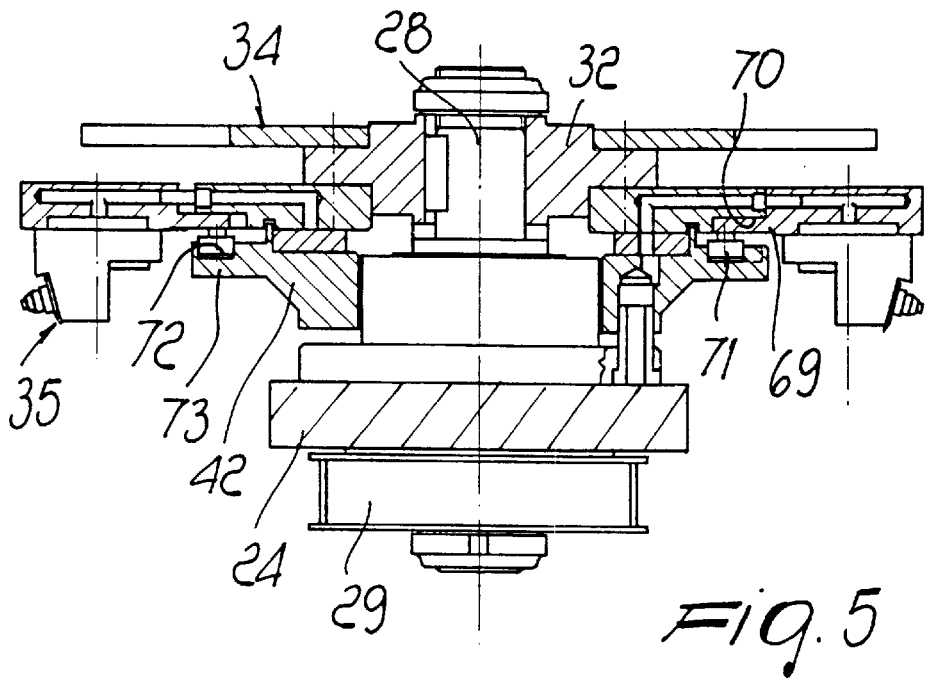
FIG. 5 is a sectional view of a second embodiment of the apparatus.
Figure 6:
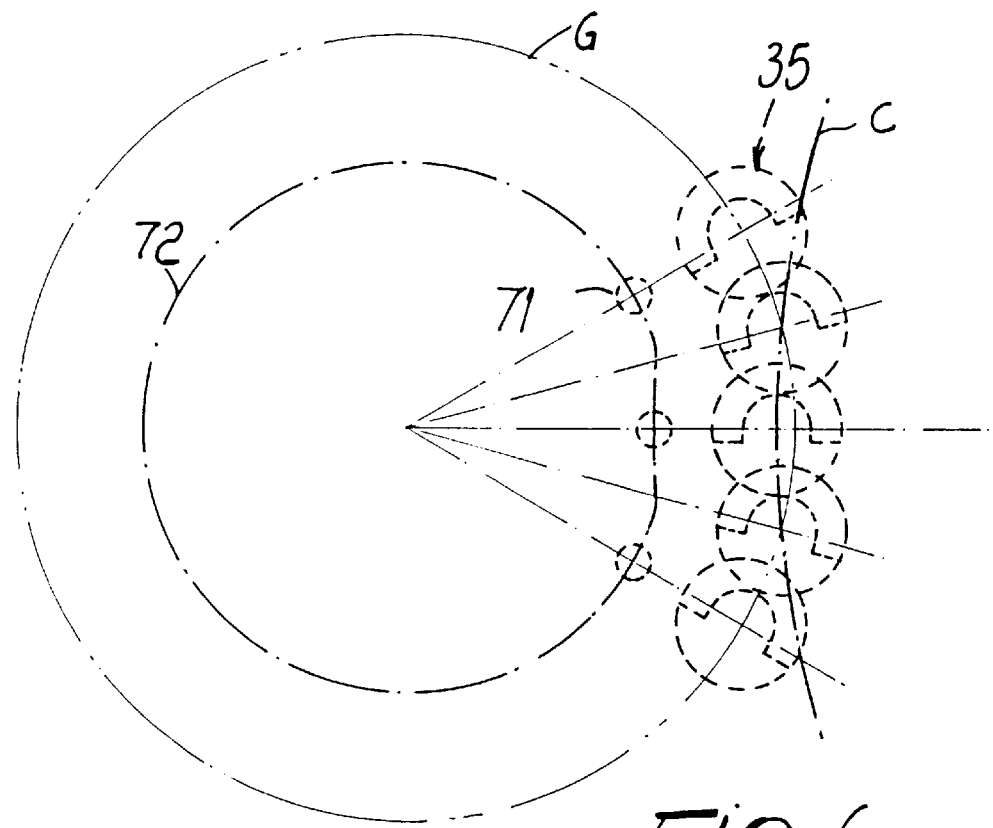
FIG. 6 is a schematic view of the operation of the embodiment of FIG. 5.

In another embodiment of the invention, shown in FIGS. 5 and 6, the individual removal elements 35 are actuated instead of actuating the head 6 by means of a cam, as described above.

For this purpose, each removal element 35 is provided with a stem 69 that is guided in a respective radial seat 70 of the pan 33. A roller 71 is mounted on each stem 69 and slidingly engages a slot 72 of a cam 73 that is formed in the peripheral region of the distribution ring 42 and is thus rotationally rigidly coupled to the linkage 24.

As more clearly shown in FIG. 6, the slot 72 has such a shape as to allow the removal element 35 to follow the cavity 5 of the respective mold 4 along an arc of the path C that is sufficient to ensure the transfer of the dose into the cavity.

In practice, it has been observed that in order to ensure perfect removal of the doses from the nozzle 46 the removal elements 35 must rotate at a higher speed than the punches 3. This causes the tangential speed of the caps when they are disengaged from the punches 3 to be lower than that of the pan 33, and therefore when the caps make contact with the pan 33 and the star 34 they may overturn, especially if they are tall, and compromise correct exit along the channel 51.

In order to prevent this, the embodiment shown in FIG. 7 has a cap receiving disk 74 arranged above the pan 33; said disk receives its rotary motion from the pan 33 by means of a reduction gear system of the epicyclic type, which makes the tangential speed of the disk equal to that of the punches. Said gear system comprises a stationary gear 75 that is provided with central sleeves 76 and is rotatably supported, by means of bearings 77, on a bush 78 that is fixed coaxially to the flange 32 for mounting the pan 33. The gear 75 is caused to be stationary by means of a traction element 79 that connects the top of the sleeve 76 to a post 80 that is fixed to the linkage 24.

The disk 74 is rotatably supported on the sleeve 76 by means of bearings 81, so as to form, together with the pan 33, a compartment 82 in which a gear 83, fixed below the disk 74, is accommodated.

Motion is transmitted to the gear 83 and therefore to the disk 74 by means of twin pinions 82 that can rotate about pivots 83 that rise from the pan 33.

The transmission ratio between the gears 75 and 83 is chosen so that when the caps are deposited on the disk there is no appreciable difference between their speed and the speed of the disk, so as to ensure that the caps keep their orientation.

A considerable advantage of the present invention is constituted by the fact that the jack 23 allows to rotate the entire head 6 into a position that lies outside the carousel, to prevent mechanical interferences with the molds 4 in case of jamming. Maintenance of the removal elements 35 and of the molding units, as well as of the extruder 46, is furthermore facilitated.

In the practical embodiment of the invention, the shapes and dimensions may be any according to the requirements.

I claim:

1. Apparatus for the pressure-molding of cap items made of plastics, comprising:
   a rotating pressure-molding carousel composed of a supporting element that rotates about a vertical central axis;
   a plurality of pressure-molding units that are mounted on said rotating supporting element concentrically and at equal angular distances with respect to said central axis, each one of said units comprising an upper punch and a lower mold that has a molding cavity, said punches and molds cooperating with each other and being mutually movable along vertical axes;
   means for actuating said supporting element, so that said molding units advance along a circular path that includes a region for loading the plastics to be molded, a molding region, a cooling region, and a region for unloading the molded item;
   means for moving the punches with respect to the molds along the corresponding axes according to a preset criterion during the rotation of said supporting element;
   a device for extruding said plastics, provided with a nozzle;
   a head for feeding doses of the plastics to be molded, said head being rotatable about an axis that is parallel to said central axis and is external to said circular path;
   a plurality of removal elements that are mounted on said head concentrically with respect to said parallel axis and at the same angular distance, said elements being movable along a circular path that has a point which is tangent to said circular path of said molding units, each one of said removal elements being constituted by a substantially semicylindrical cup that has a concave portion that is orientated in the direction of the rotation of said head;
   said extrusion device being stationary with respect to said head, said nozzle ejecting upward a flow of plastics, and said cups removing, in succession, doses of plastics at the outlet of said nozzle;
   said head and said carousel being mutually synchronized so that the removal elements and the molds are mutually aligned in succession at said point of tangency;
   said head being mounted at the end of a linkage that is pivoted to the top of a vertical post and is movable by way of an actuator so as to move said head away from said carousel.

2. Apparatus according to claim 1, wherein said head comprises a pan that supports the removal elements and is keyed on a vertical shaft rotatably supported in a sleeve that is rigidly coupled to said linkage, a driven pulley being keyed on said shaft, a belt engaging said driven pulley and being closed in a loop around a driving pulley keyed on a drive shaft that is supported inside said post coaxially to the axis about which said linkage is articulated to said post.

3. Apparatus according to claim 2, wherein a sleeve is rigidly coupled to said linkage coaxially to said drive shaft, an arm being fixed to said sleeve and connected to a jack, the actuation of said jack causing the oscillation of said linkage and the spacing of said head from said carousel into a position in which said removal elements do not interfere with said molding units.

4. Apparatus according to claim 3, wherein a star is keyed on said shaft that supports the pan and above said pan, said star having radial arms and being adapted to push towards a removal channel the stabilized items that leave the carousel and are deposited on said pan.

5. Apparatus according to claim 4, wherein said channel is constituted by two parallel guides that comprise two portions that are concentric with respect to the rotation axis of the pan and two portions that are tangent to the pan, between which there is a plane that is co-planar with respect to said pan and forms the bottom of the removal channel.

6. Apparatus according to claim 5, wherein said linkage has an arm provided with a roller that follows a cam keyed on a secondary shaft actuated by said drive shaft, said cam being adapted to actuate said linkage into a position in which the circular path followed by said removal elements intersects, over a given angle, the path followed by said molding units.

7. Apparatus according to claim 5, wherein said removal elements are guided radially on said pan and are actuated by a cam that is concentric to said rotation axis of the head and is stationary with respect to said linkage.

8. Apparatus according to claim 7, wherein a coaxial disk for receiving the items that leave thee carousel is rotatably supported above said pan, said disk being actuated by said pan by way of an epicyclic reduction gear system so as to cause the tangential speed of said disk to match that of said carousel.

9. Apparatus according to claim 8, comprising expulsion means that are associated with said removal elements, said expulsion means being adapted to transfer the removed doses into the cavities of said molds at said point of tangency.

10. Apparatus according to claim 8, wherein said expulsion means are constituted by holes that lead into said concave portion of the cups and are connected to a source of compressed air through distribution means that are such as to cause the expulsion of air through said holes when said cups are aligned with said molds.

11. Apparatus according to claim 9, wherein said expulsion means comprise, for each removal element, a piston that is slideable in a respective seat of said head and is provided with a stem that is adapted to engage the concave portion of said cup, said piston being connectable to a source of compressed air through distribution means that are such as to cause said stem to enter said concave portion and cause the expulsion of the removed dose.

12. Apparatus according to claim 11, wherein said stem has a tubular shape, so as to form a cavity that has through holes at the end that engages in the concave portion of said cup, said stem being guided on a tang, said tang being provided with an axial hole that leads out axially and with radial holes, connected to said axial hole, that lead out radially; said piston being pneumatically movable between a position for disengagement from said concave portion and a position for engagement in said concave portion, so as to cause the mechanical expulsion of the dose, compressed air being conveyed through said through, axial and radial holes in order to complete the expulsion of said dose.

* * * * *